(12) United States Patent
Stacey

(10) Patent No.: US 9,112,892 B2
(45) Date of Patent: Aug. 18, 2015

(54) INVERSE MULTIPLEXING OVER 802.11 WIRELESS INTERFACES

(75) Inventor: Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 642 days.

(21) Appl. No.: 12/629,922

(22) Filed: Dec. 3, 2009

(65) Prior Publication Data

US 2011/0134894 A1    Jun. 9, 2011

(51) Int. Cl.
| | |
|---|---|
| H04W 4/00 | (2009.01) |
| H04L 12/28 | (2006.01) |
| H04L 12/56 | (2006.01) |
| H04J 3/24 | (2006.01) |
| H04L 29/06 | (2006.01) |
| H04W 28/06 | (2009.01) |
| H04W 80/02 | (2009.01) |
| H04W 84/12 | (2009.01) |

(52) U.S. Cl.
CPC ............. *H04L 69/14* (2013.01); *H04W 28/065* (2013.01); *H04W 80/02* (2013.01); *H04W 84/12* (2013.01)

(58) Field of Classification Search
CPC ............................ H04L 69/14; H04W 28/065
USPC ................................ 370/338, 394, 395, 474
See application file for complete search history.

(56) References Cited

U.S. PATENT DOCUMENTS

| | | | | |
|---|---|---|---|---|
| 6,788,686 | B1 * | 9/2004 | Khotimsky et al. | 370/394 |
| 2004/0233887 | A1 * | 11/2004 | Meiling et al. | 370/349 |
| 2005/0243849 | A1 | 11/2005 | Wentink | |
| 2008/0013539 | A1 * | 1/2008 | Poyhonen et al. | 370/390 |
| 2008/0220787 | A1 * | 9/2008 | Stanwood et al. | 455/450 |
| 2008/0320156 | A1 | 12/2008 | Chen | |
| 2009/0262753 | A1 * | 10/2009 | On et al. | 370/466 |
| 2009/0296737 | A1 * | 12/2009 | Arye | 370/465 |
| 2010/0278062 | A1 * | 11/2010 | Abraham et al. | 370/252 |

FOREIGN PATENT DOCUMENTS

| | | |
|---|---|---|
| JP | 2008-167285 | 7/2008 |
| JP | 2009-164751 | 7/2009 |
| WO | WO 2006-125738 A1 | 11/2006 |

OTHER PUBLICATIONS

International Search Report with Written Opinion corresponding to PCT/US2010/050029, dated Jun. 7, 2011, 10 pages.

(Continued)

*Primary Examiner* — Shripal Khajuria
*Assistant Examiner* — Farhad Ali
(74) *Attorney, Agent, or Firm* — Pillsbury Winthrop Shaw Pittman LLP

(57) ABSTRACT

In accordance with various aspects of the disclosure, a method and apparatus are disclosed that includes aspects of providing one or more data packets at a media access control-service access point of a transmitting device; dividing the one or more data packets into two or more streams of data packets, wherein the two or more streams of data packets are arranged for transmission on a separate wireless interface of the transmitting device; and transmitting the two or more streams of data packets over a wireless medium via their separate wireless interfaces.

18 Claims, 4 Drawing Sheets

(56) References Cited

OTHER PUBLICATIONS

International Preliminary Report on Patentability corresponding to PCT/US2010/050029, dated Jun. 14, 2012, 7 pages.
State Intellectual Property Office of the People's Republic of China, Office Action, Application No. 201010293340.X, mail date Apr. 3, 2013, total of 11 pages.
Japanese Office Action, Japanese Patent Application No. 2012-542002, mail date Sep. 24, 2013, a total of 25 pages.
State Intellectual Property Office (SIPO) of the People's Republic of China, Chinese Office Action, Application No. 201010293340.X, mail date Dec. 18, 2013, total of 6 pages.
Japanese Office Action, Japanese Application No. 2012-542002, issued date Jul. 8, 2014.
Korean Office Action, English translation of the notice of preliminary rejection office action summary, Korean Application No. 2012-7104203, issued Oct. 19, 2012, a total of 5 pages.

\* cited by examiner

US 9,112,892 B2

INVERSE MULTIPLEXING OVER 802.11 WIRELESS INTERFACES

BACKGROUND

This disclosure relates generally to the field of wireless network communication, and in particular to a method and apparatus configured to allow inverse multiplexing over 802.11 wireless interfaces.

In many wireless communication systems, a frame structure is used for data transmission between a transmitter and a receiver. For example, the IEEE 802.11 standard uses frame aggregation in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PLCP (Physical Layer Convergence Protocol) Service Data Unit (PSDU) and is transferred to a PHY layer in the transmitter to attach a PHY header (i.e., a PHY preamble) thereto to construct a PLCP Protocol Data Unit (PPDU). The PHY header includes parameters for determining a transmission scheme including a coding/modulation scheme.

Conventionally, APs allow simultaneous dual band operation, such as at 2.4 and 5 GHz. It is desirable to have a technique that allows higher throughput if both STA and AP support simultaneous dual band operation.

DETAILED DESCRIPTION

Figure 1:
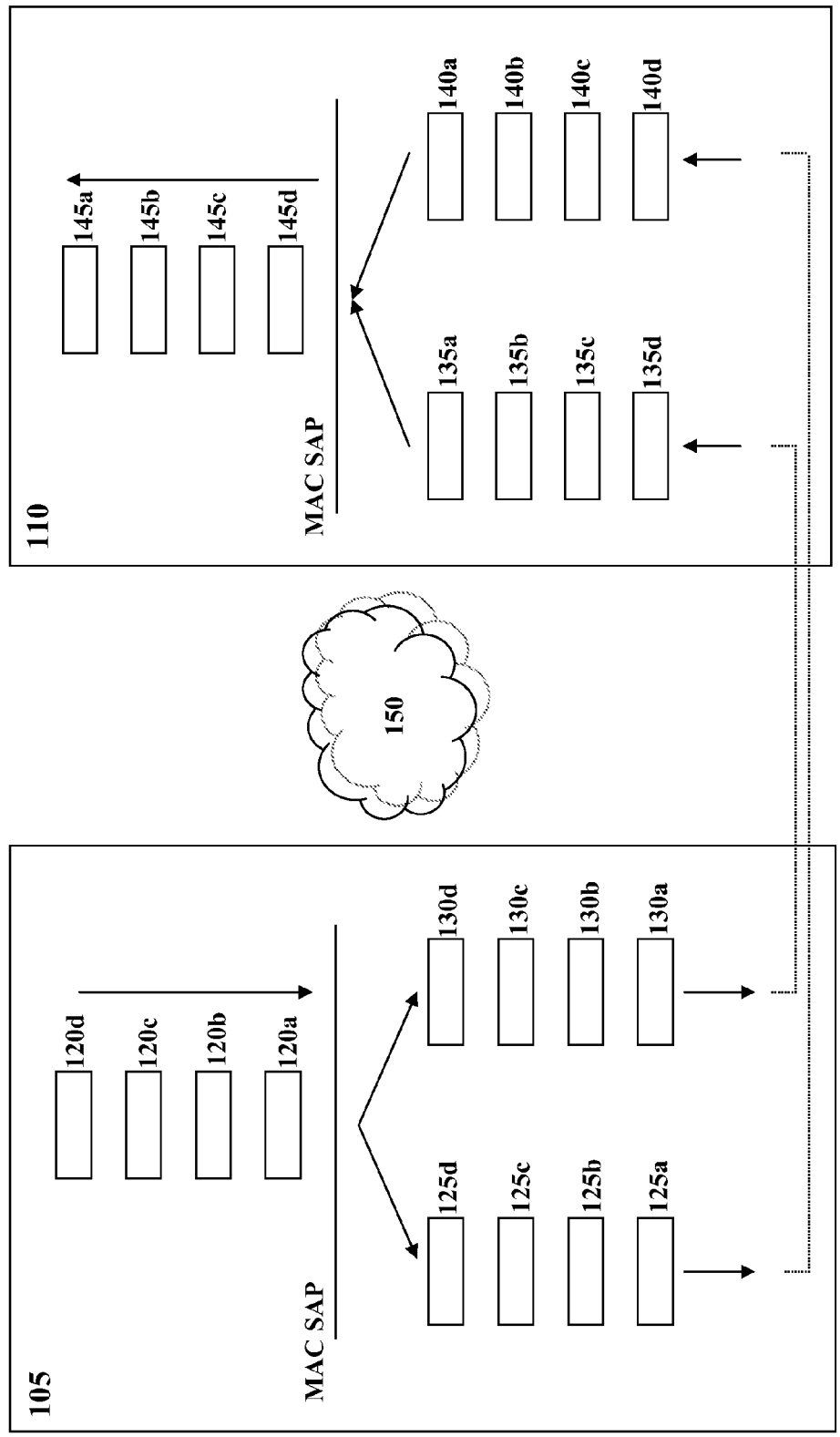
FIG. 1 shows an example process of dividing a single stream of data packets arriving at the MAC SAP of a transmitter station into two or more streams that travel of different wireless interfaces and merging them the data streams at a receiver station using inverse multiplexing in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Definitions

Access Point (AP): Any entity that has a station (STA) functionality and provides access to the distribution services, via the wireless medium (WM) for associated STAs.

Media Access Control (MAC): A Media Access Control (MAC) is a data communication protocol sub-layer, also known as the Medium Access Control, is a sublayer of the Data Link Layer specified in the seven-layer OSI model (layer 2).

Service Access Point (SAP): A Service Access Point (SAP) is an identify label for network endpoints used in Open Systems Interconnection (OSI) networking. The SAP is a physical point or conceptual location at which one OSI layer can request the services of another OSI layer. The SAP serves as a channel through which data is transmitted and received to and from the upper layer protocol. For example, a MAC-SAP provides a service enabling the upper layer protocol to transmit and receive data to and from a MAC sublayer.

Station (STA): Any device that contains an IEEE 802.11-conformant medium access control (MAC) and physical layer (PHY) interface to the wireless medium (WM).

Wireless medium (WM): The medium used to implement the transfer of protocol data units (PDUs) between peer physical layer (PHY) entities of a wireless local area network (LAN).

Description

In accordance with various embodiments of this disclosure, a method is disclosed that comprises providing one or more data packets at a media access control-service access point of a transmitting device; dividing the one or more data packets into two or more streams of data packets, wherein the two or more streams of data packets are arranged for transmission on a separate wireless interface of the transmitting device; and transmitting the two or more streams of data packets over a wireless medium via their separate wireless interfaces.

In accordance with various embodiments of this disclosure, the method further comprises arranging one or more consecutively received data packets into blocks where each block of data packets is placed in a queue of one of the wireless interfaces; and assigning each data packet queued for a particular wireless interface a sequence number representative of an order in which the data packet is queued.

In accordance with various embodiments of this disclosure, the method further comprises adding a block synchronization frame to a queue prior to queuing a new block of data packets on that queue.

In accordance with various embodiments of this disclosure, the method further comprises assigning the block synchronization frame a sequence number representative of the order in which the block synchronization frame is queued; and including a sequence number of a last data frame added to a previous queue in a body of the block synchronization frame.

In accordance with various embodiments of this disclosure, the method further comprises including an identifier for the wireless interface associated with the queue where the last data frame was queued in the body of the block synchronization frame.

In accordance with various embodiments of this disclosure, the method further comprises adding a block synchronization frame to a queue after queuing a new block of data packets on that queue.

In accordance with various embodiments of this disclosure, the method further comprises assigning the block synchronization frame a sequence number representative of the order in which the block synchronization frame is queued;

and including the sequence number of a next data frame to be added to a subsequent queue and an identifier for the wireless interface associated with the queue where the next data frame will be queued in a body of the block synchronization frame.

In accordance with various embodiments of this disclosure, the method further comprises adding a block sequence number to each data packet.

In accordance with various embodiments of this disclosure, the method further comprises wherein each data packet includes a sequence number assigned for queue on the interface on which it is queued and a block number.

In accordance with various embodiments of this disclosure, an apparatus is disclosed that comprises a media access control layer service access point configured to receive one or more data packets; an inverse multiplexer configured to divide the one or more data packets into two or more streams of data packets, wherein the two or more streams of data packets are arranged for transmission on a separate wireless interface; and a transmitter configured to transmit the two or more streams of data packets over a wireless medium via their separate wireless interfaces.

In accordance with various embodiments of this disclosure, the apparatus further comprises wherein the inverse multiplexer is configured to arrange one or more consecutively received data packets into blocks where each block of data packets is placed in a queue of one of the wireless interfaces and assign each data packet queued for a particular wireless interface a sequence number representative of an order in which the data packet is queued.

In accordance with various embodiments of this disclosure, the apparatus further comprises wherein the inverse multiplexer is configured to add a block synchronization frame to a queue prior to queuing a new block of data packets on that queue.

In accordance with various embodiments of this disclosure, the apparatus further comprises wherein the inverse multiplexer is configured to assign the block synchronization frame a sequence number representative of the order in which the block synchronization frame is queued and include a sequence number of a last data frame added to a previous queue in a body of the block synchronization frame.

In accordance with various embodiments of this disclosure, the apparatus further comprises wherein the inverse multiplexer is configured to include an identifier for the wireless interface associated with the queue where the last data frame was queued in the body of the block synchronization frame.

In accordance with various embodiments of this disclosure, the apparatus further comprises wherein the inverse multiplexer is configured to add a block synchronization frame to a queue after queuing a new block of data packets on that queue.

In accordance with various embodiments of this disclosure, a method is disclosed that comprises receiving two or more streams of data packets over a wireless medium on separate interfaces; receiving transmitter inserted block synchronization frames on the separate interface; and arranging the received two or more streams of data packets and the inserted block synchronization frames into a receive queue at a media access control layer service access point.

In accordance with various embodiments of this disclosure, the method further comprises ordering and merging the received two or more streams of data packets based on the inserted block synchronization frames.

In accordance with various embodiments of this disclosure, the method further comprises determining the order in which the data packets are delivered to a layer higher than the media access control layer based on a block number and a sequence number from the block synchronization frames.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

In general, aspects of the present disclose relate to the IEEE 802.11 TGad PAR requirement for "fast session transfer." Fast session transfer refers to the handover of a data session from a 60 GHz channel to a 5 or 2.4 GHz channel or vice versa should link conditions deteriorate or improve. In accordance with aspects of the present disclosure, the session transfer would be a partial transfer (some of the data packets) with data transfer continuing on both channels (while conditions permit) taking advantage of the combined bandwidth available.

In some aspects, the present disclosure relates to TGac where higher throughput is being sought by increasing bandwidth (80 MHz channel bandwidth) and where discontiguous channel bonding can be used, such as combining two discontiguous 40 MHz channels. If the channels bonded are sufficiently separated in frequency, for example, one in the 2.4 GHz band and the other in 5 GHz band or even channels at opposite ends of the 5 GHz band, then independent operation in the lower MAC and PHY on each channel can be utilized.

In general, aspects of the present disclosure allow for inverse multiplexing over two or more channels that are sufficiently separated in frequency to permit simultaneous, independent operations. For examples, a 2.4 GHz band channel and a 5 GHz band channel, two GHz band channels at opposite ends of the band, a 5 GHz band channel and a 60 GHz band channel, and a 2.4 GHz band channel, a 5 GHz band channel and a 60 GHz band channel can be used.

FIG. 1 shows an example process of dividing a single stream of data packets arriving at the MAC SAP of a transmitter station into two or more streams that travel of different wireless interfaces and merging them the data streams at a receiver station using inverse multiplexing in accordance with various aspects of the present disclosure. With inverse multiplexing a stream of packets from a higher layer is load balanced across two or more links. At the remote end the individual packet streams from each link are spliced together and delivered, in the original sequence, to the upper layer. The lower MAC and PHY on each of the links operate independently of each other.

As shown in FIG. 1, an example network architecture including STAs, such as transmitter station 105 and receiver station 110, are arranged to communicate over wireless network 150 through a wireless medium. One or more data packets, 120*a*, 120*b*, 120*c* and 120*d* arrive at a media access control (MAC) layer service access point (SAP) of transmitter 105. The one or more data packets, 120*a*, 120*b*, 120*c* and 120*d* are divided at the MAC SAP into separate streams of data packets represented by packet 125*a*, 125*b*, 125*c* and 125*d* in one stream and by data packets 130*a*, 130*b*, 130*c* and 130*d* in the other stream. FIG. 1 show one example where the one or more data packets are divided into two streams; however, the one or more data packets can be divided into more than two streams. The data packets from the two or more streams are then arranged for transmission to receiver 110 on separate wireless interfaces of transmitter 105. The two or more streams of data packets are then transmitting to receiver 110 over the wireless medium via their separate wireless interfaces of transmitter 105.

The two or more streams of data packets are then received at receiver 110 over the wireless medium. A first stream of data packets 135a, 135b, 135c and 135d and a second stream of data packets 140a, 140b, 140c and 140d are received at the receiver 110. The received streams of data packets are spliced together as data packets 145a, 145b, 145c and 145d and delivered, in the original sequence, to the upper layers of receiver 110.

In some aspects, the two communicating STAs, transmitter station 105 and receiver station 110, are configured to determine that they have matching simultaneous multi-band operating capabilities. For example, two communicating STAs can be configured with management functions that allow the STAs to agree to load balance traffic across two or more channels. Moreover, both the STAs can operate in each of the channels independently.

In some aspects, the two communicating STAs can be configured to include control functions that enable and disable operation of the load balanced link. For example, the STAs can dynamically switch in or out the second or subsequent interfaces while data transfer is in progress.

In some aspects, the two communicating STAs can be configured to assign a MAC address to the load balanced link. For example, a single MAC address can be presented to the higher layer so that the load balanced link is treated by the higher layers as a single logical link by which the destination is reached. This MAC address can be different from the MAC address used on the individual channels. In some aspects, the MAC address exposed to the higher layers can be the same as that used on one of the channels (or all, if all channels use the same MAC address). Different packet formats may be needed to cater to the different MAC address assignment options.

In some aspects, the two communicating STAs can be configured to support the re-ordering of packets at the destination such that the packets are delivered to the higher layers in the same order in which they were delivered to the MAC at the source. Data packets can arrive at receiver station 110 out of order due to the independent lower MAC operation, such as channel access delay, retransmissions, etc, and network activity on each of the channels.

Figure 2:
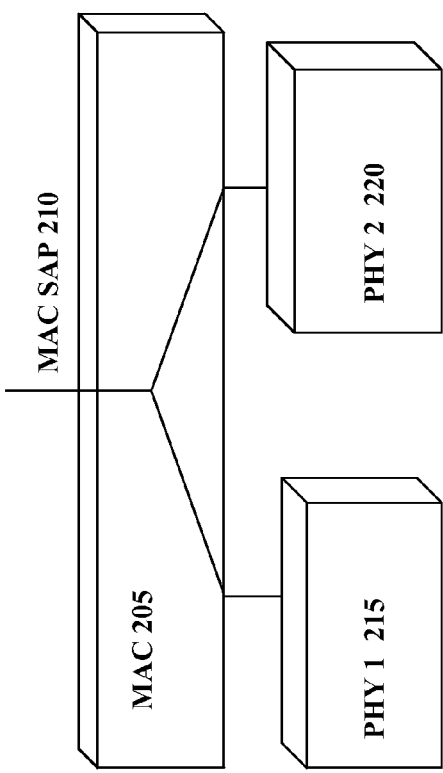
FIG. 2 shows an example inverse multiplexing arrangement with a single MAC straddling two PHYs in accordance with various aspects of the present disclosure.

FIG. 2 shows an example inverse multiplexing arrangement with a single MAC straddling two PHYs in accordance with various aspects of the present disclosure. The use of a single MAC 205 with physical layer PHY 1 215 and physical layer PHY 2 220 allows a single interface to be presented to the higher layer, including MAC SAP 210 and allows the same MAC address to be used on both channels.

Figure 3:
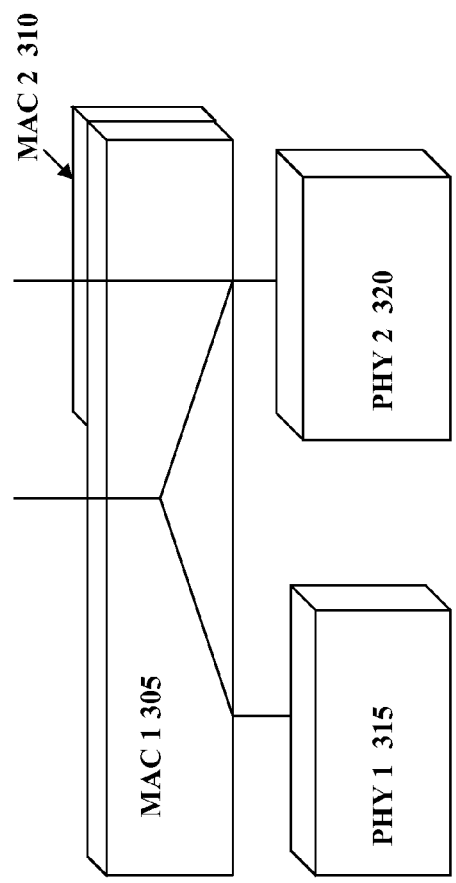
FIG. 3 shows another example multiplexing arrangement with each PHY having its own MAC and two MAC Service Access Point (SAP) interfaces in accordance with various aspects of the present disclosure.

FIG. 3 shows another example multiplexing arrangement with each PHY having its own MAC and two MAC Service Access Point (SAP) interfaces in accordance with various aspects of the present disclosure. In this example, each physical layer PHY 1 315 and PHY 2 320 has its own MAC, MAC 1 305 and MAC 2 310, respectively, and two MAC Service Access Point (SAP) interfaces are presented to the higher layers. MAC 1 305 can be configured to support inverse multiplexing and can straddle both of the PHYs, appearing on the second PHY as a virtual MAC, i.e., in addition to the native MAC. Traffic from the MAC SAP of the first wireless interface using the second wireless interface would be multiplexed with traffic from the MAC SAP of the second wireless interface. Each MAC presents its own MAC address to the higher layers. Inverse multiplexed traffic uses the same MAC address on both channels.

The two techniques are described below with reference to FIGS. 4-6 for preserving the order in which packets are delivered. The first technique, of which there are two variations as discussed in relation to FIGS. 4 and 5, uses a Block Sync frame inserted into the data stream to delineate the data blocks delivered to each Data packet. For simplicity, the techniques are described for 2 wireless channels, but are extensible in a straight forward way to 3 or more channels.

Figure 4:
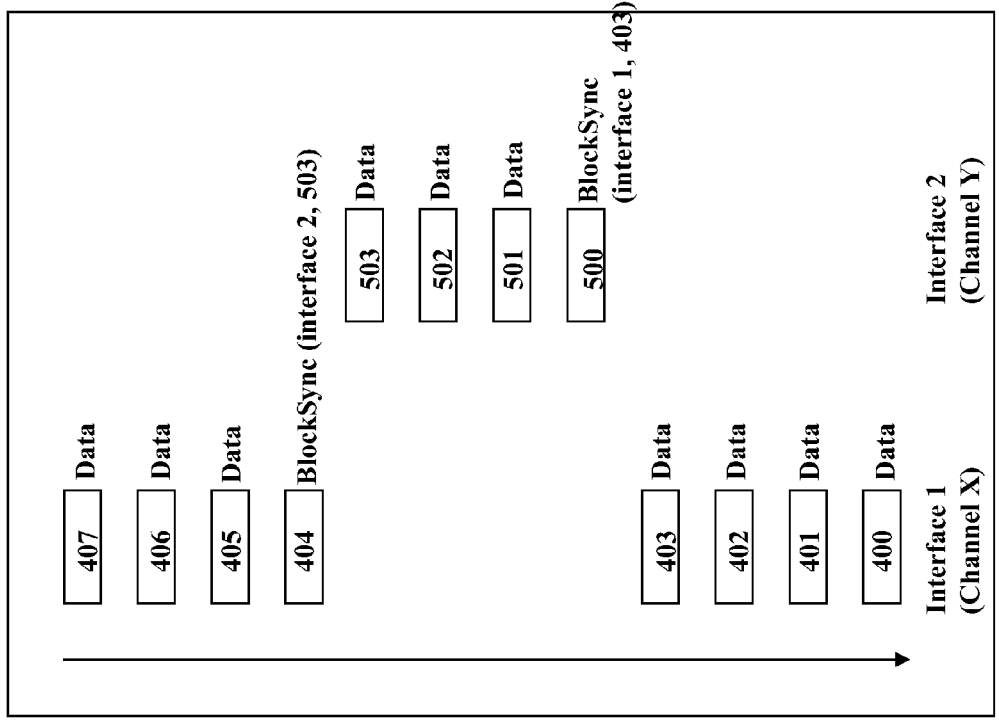
FIG. 4 shows an example packet ordering arrangement using sync frames in accordance with various aspects of the present disclosure.

FIG. 4 shows an example packet ordering arrangement using sync frames in accordance with various aspects of the present disclosure. Data packets arrive from the higher layer in the following order: 400-403, followed by 501-503, followed by 405-407. Data packets 400-403 are placed in a queue of interface 1 operating on channel X. Subsequent packets will be placed in a queue of interface 2 operating on channel Y, thus a BlockSync frame 500 can be created and queued on interface 2 to indicate that a switch to interface 2 has occurred. Data packets 501-503 then are placed in the queue of interface 2 operating on channel Y. As each packet is queued it is assigned the next sequence number for that interface. This series of packets placed in one queue between switches from one queue to the other is referred to as a block, with the block sync frames delineating the blocks. The next series of packets is to be placed in the queue of interface 1 again, thus a BlockSync frame 404 is inserted onto that queue. Data packets 405-407 are then queued on that interface. The block size, meaning the number of data packets placed on a queue before a switch is made to another queue, is arbitrary. In this example, the block size is 4, 3 and 3.

Before a new block of packets is placed in a queue, a Block Sync frame is inserted. The Block Sync frame is assigned the next sequence number for that queue and also carries the sequence number and interface of the last data frame added to the previous queue. The Block Sync frames thus identify the points in the sequence where there is a switch from one interface to the other. As shown in FIG. 4, BlockSync frame 500 indicates a switch from interface 1 to interface 2, with the last data frame queued on interface 1 being 403. Similarly, BlockSync frame 404 indicates a switch from interface 2 to interface 1 and that the last data packet queued on interface 2 was 503.

At the receiver station, data packets arrive on each interface and are queued in a receive queue. In some aspects, an acknowledgement (ACK frame) is sent from the receiving station to the transmitting station to confirm the reception of each frame. If the transmitter does not receive an ACK, the transmitter can retransmits the frame until an ACK is received. The ACK mechanism can also be used in rate adaptation algorithms so that if too many retransmissions are required, the transmitting station can drop to a lower data rate. In some aspects, a block acknowledgement mechanism, where a single block ACK frame is sent to acknowledge several received frames, can be used.

If a block acknowledgement (BA) is being employed on a particular interface, then the data packets can be reordered as appropriate based on their sequence number. For example, data packets may need reordering due to selective retransmissions. After the reorder process, the receiver station can merge the data packet flows for delivery to the higher layer in the receiver station. For example, all the queues in the inverse mux group can be in the release state. When in the release state, in-order MAC Service Data Units (MSDUs) can be released from the queue to the higher layer. The MSDU is the Service Data Unit that is received from or sent to the LLC sub-layer which lies above the MAC sub-layer in a protocol stack. The LLC and the MAC sub-layers are collectively referred to as the DLL.

On receipt of a Block Sync frame, the receiver station can compare the sequence number carried in the Block Sync frame to the last frame released from the other interface queue. For example, if the Block Sync frame carries a sequence number value that has already been delivered from the other queue, then the current queue is placed in the released state. Otherwise, the queue is placed in the hold state until the MSDU with the indicated sequence number on the other queue is delivered or bypassed. In some aspects, an MSDU can be bypassed if the transmitter station discards it after its retry count expires.

Figure 5:
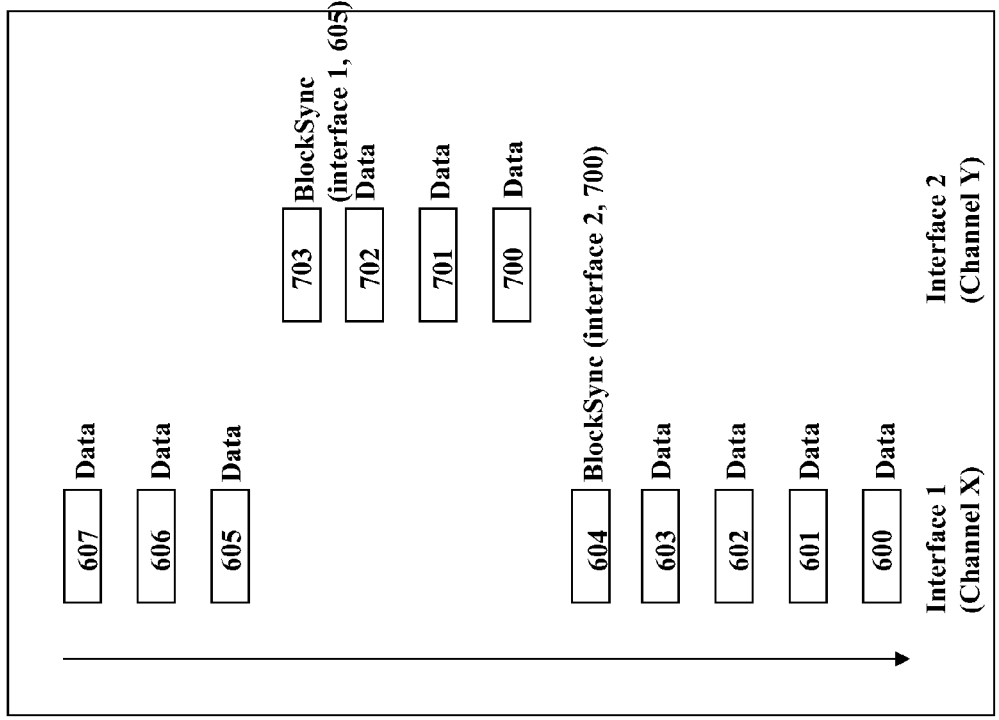
FIG. 5 shows another example packet ordering arrangement using sync frames in accordance with various aspects of the present disclosure.

FIG. 5 shows another example packet ordering arrangement using sync frames in accordance with various aspects of the present disclosure. In this example, the BlockSync frame can be sent on the interface where the last data frame was sent before the switch to the other interface. Data packets arrive from a higher layer in the following order: 600-603, followed by 700-702, followed by 605-607. Data packets 600-603 are placed in a queue of interface 1 operating on channel X. The BlockSync frame 604 can then be created and placed in the queue of interface 1 and indicates a switch from interface 1 to interface 2 and also indicates that the next data packet in the sequence is 700 on interface 2. The BlockSync frame 703 can then be placed in the queue on interface 2 and indicates a switch from interface 2 to interface 1 and that the next data packet is 605. Data packets 605-607 are queued on interface 1 operating on channel X.

Figure 6:
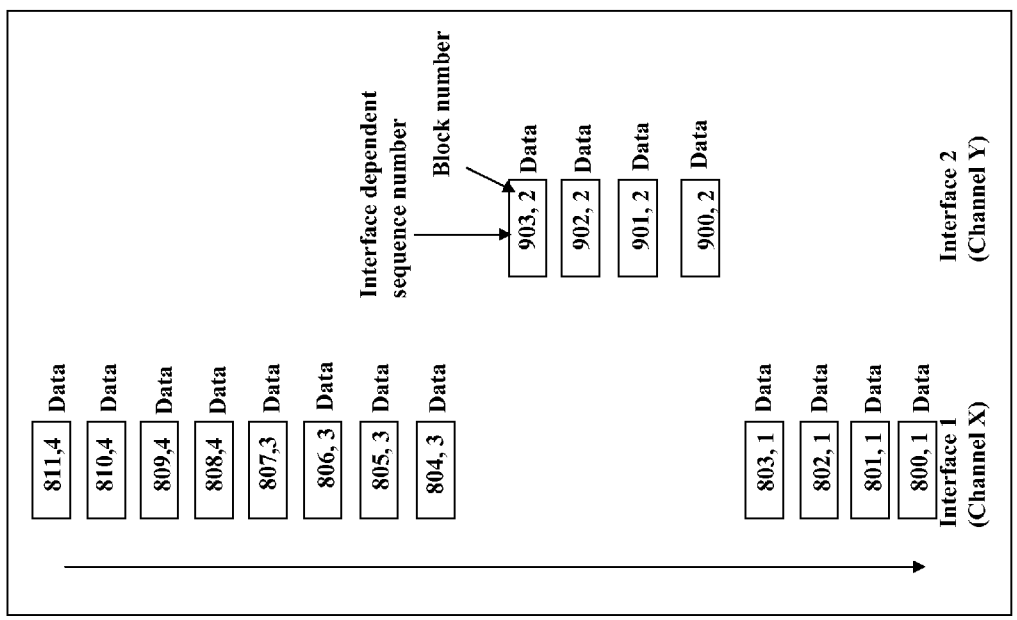
FIG. 6 shows another example packet ordering arrangement using block number in each packet in accordance with various aspects of the present disclosure.

FIG. 6 shows another example packet ordering arrangement using block number in each packet in accordance with various aspects of the present disclosure. In some aspects, packet ordering can be performed by adding a block sequence number to each data packet. Each packet would then have a sequence number assigned for the interface on which it is queued as well as a block number. In this example, a fixed block size of four packets is shown; however other suitable block sizes may be used. After queuing a block size worth of packets on one interface, the block number is incremented and the another block size of packets are queued, either on the next interface or the same interface. In effect, the block number together with the low order bits of the sequence number determine the order in which packets are delivered at the recipient to the higher layer.

As shown in FIG. 6, data packets 800-803 are grouped as block 1 on interface 1. Data packets 900-903 are grouped as block 2 on interface 2. Data packets 804-807 are grouped as block 3 on interface 1 and data packets 808-811 are grouped as block 4 on interface 1.

At the receiver station, after the re-order process, packets are delivered to the higher layers following the block number and low order bits from sequence number. In some aspects, heuristics that can detect packet loss using, for example, timeouts or a block acknowledgement request (BAR) frame, may ensure that data is not held in the receive queues too long waiting for sequence number infill.

In some aspects, the block number field can be implemented to reuse the Fragment Number field in the Sequence Control field. For example, on some high speed interfaces such as those defined for 802.11n and expected for 802.11ac and 802.11ad, the fragment number is not needed. Since the block number field can be a 4-bit field, this would permit block numbering modulo 16. In some aspects, a new field can be defined for the block number field in the data frame, which would permit a block numbering through a larger modulus (e.g. 256 or 65536).

Although the above disclosure discusses what is currently considered to be a variety of useful embodiments, it is to be understood that such detail is solely for that purpose, and that the appended claims are not limited to the disclosed embodiments, but, on the contrary, are intended to cover modifications and equivalent arrangements that are within the spirit and scope of the appended claims.

What is being claimed:

1. A method comprising:
providing one or more data packets at one of a plurality of media access control-service access point (MAC-SAP) interfaces of a transmitting device;
dividing the one or more data packets into two or more streams of data packets, wherein the two or more streams of data packets are arranged for transmission on respective separate wireless interfaces of the transmitting device, wherein each wireless interface is associated with one of the plurality of MAC-SAP interfaces;
simultaneously transmitting the two or more streams of data packets over a wireless medium via their respective separate wireless interfaces;
arranging one or more consecutively received data packets into blocks, wherein each block of the data packets is placed in a queue of one of the wireless interfaces, and wherein a data packet of one of the blocks placed in a queue of a particular wireless interface is assigned an interface-specific sequence number representative of an order in which the data packet is placed in the queue of the particular wireless interface and a block sequence number representative of an order in which the one of the blocks is placed in the queue across all of the wireless interfaces; and
adding a block synchronization frame to a queue prior to queuing a new block of data packets on that queue.

2. The method according to claim 1, further comprising:
assigning the interface-specific sequence number to each data packet of each block queued for the particular wireless interface.

3. The method according to claim 1, further comprising:
assigning the block synchronization frame a sequence number representative of the order in which the block synchronization frame is queued; and
including a sequence number of a last data frame added to a previous queue in a body of the block synchronization frame.

4. The method according to claim 3, further comprising:
including an identifier for the wireless interface associated with the queue where the last data frame was queued in the body of the block synchronization frame.

5. The method according to claim 1, further comprising:
adding a block synchronization frame to a queue after queuing a new block of data packets on that queue.

6. The method according to claim 5, further comprising:
assigning the block synchronization frame a sequence number representative of the order in which the block synchronization frame is queued; and
including the sequence number of a next data frame to be added to a subsequent queue and an identifier for the wireless interface associated with the queue where the next data frame will be queued in a body of the block synchronization frame.

7. The method according to claim 1, further comprising:
adding the block sequence number to each data packet.

8. An apparatus comprising:
a plurality of media access control-service access point (MAC-SAP) interfaces at least one of which is configured to receive one or more data packets;

an inverse multiplexer configured to divide the one or more data packets into two or more streams of data packets, wherein the two or more streams of data packets are arranged for transmission on respective separate wireless interfaces, wherein each wireless interface is associated with one of the plurality of MAC-SAP interfaces; and a transmitter configured to transmit the two or more streams of data packets over a wireless medium via their respective separate wireless interfaces, wherein the inverse multiplexer is further configured to arrange one or more consecutively received data packets into blocks, wherein each block of the data packets is placed in a queue of one of the wireless interfaces, and add a block synchronization frame to a queue prior to queuing a new block of data packets on that queue, wherein a data packet of one of the blocks in a queue of a particular wireless interface is assigned an interface-specific sequence number representative of an order in which the data packet is placed in the queue of the particular wireless interface and a block sequence number representative of an order in which the one of the blocks is placed in the queue across all of the wireless interfaces.

9. The apparatus according to claim 8, wherein the inverse multiplexer is further configured to assign the interface-specific sequence number to each data packet of each block queued for the particular wireless interface.

10. The apparatus according to claim 8, wherein the inverse multiplexer is configured to assign the block synchronization frame a sequence number representative of the order in which the block synchronization frame is queued and include a sequence number of a last data frame added to a previous queue in a body of the block synchronization frame.

11. The apparatus according to claim 10, wherein the inverse multiplexer is configured to include an identifier for the wireless interface associated with the queue where the last data frame was queued in the body of the block synchronization frame.

12. The apparatus according to claim 8, wherein the inverse multiplexer is configured to add a block synchronization frame to a queue after queuing a new block of data packets on that queue.

13. The apparatus according to claim 12, wherein the inverse multiplexer is configured to assign the block synchronization frame a sequence number representative of the order in which the block synchronization frame is queued, and include the sequence number of a next data frame to be added to a subsequent queue and an identifier for the wireless interface associated with the queue where the next data frame will be queued in a body of the block synchronization frame.

14. The apparatus according to claim 8, wherein the inverse multiplexer is configured to assign the block sequence number to each data packet.

15. A method comprising:
providing one or more data packets at one of a plurality of media access control-service access point (MAC-SAP) interfaces of a transmitting device;

dividing the one or more data packets into two or more streams of data packets, wherein the two or more streams of data packets are arranged for simultaneous transmission on respective separate wireless interfaces of the transmitting device, wherein each wireless interface is associated with one of the plurality of MAC-SAP interfaces, and wherein the two or more streams of data packets are associated with a single media access control (MAC) address that commonly represents the plurality of MAC-SAP interfaces of the transmitting device;

arranging one or more consecutively received data packets into blocks, wherein each block of the data packets is placed in a queue of one of the wireless interfaces; and adding a block synchronization frame to a queue of a first of the wireless interfaces prior to queuing a new block of data packets on that queue, wherein the block synchronization frame includes a sequence number of a last data packet added to a previous queue of a second of the wireless interfaces.

16. The method according to claim 15, further comprising assigning each data packet of each block placed in a queue of a particular wireless interface an interface-specific sequence number representative of an order in which the data packet is placed in the queue of the particular wireless interface.

17. An apparatus comprising:
a plurality of media access control-service access point (MAC-SAP) interfaces at least one of which is configured to receive one or more data packets;

an inverse multiplexer configured to divide the one or more data packets into two or more streams of data packets and assign a single media access control (MAC) address to the two or more streams of data packets, the single MAC address commonly representing the plurality of MAC-SAP interfaces, wherein the two or more streams of data packets are arranged for simultaneous transmission on respective separate wireless interfaces, wherein each wireless interface is associated with one of the plurality of MAC-SAP interfaces; and a transmitter configured to transmit the two or more streams of data packets over a wireless medium via their respective separate wireless interfaces, wherein the inverse multiplexer is further configured to add a block synchronization frame to a queue of a first of the wireless interfaces prior to queuing a new block of data packets on that queue, wherein the block synchronization frame includes a sequence number of a last data packet added to a previous queue of a second of the wireless interfaces.

18. The apparatus according to claim 17, wherein the inverse multiplexer is further configured to assign each data packet of each block placed in a queue of a particular wireless interface an interface-specific sequence number representative of an order in which the data packet is placed in the queue of the particular wireless interface.

\* \* \* \* \*